United States Patent Office 3,158,057
Patented Nov. 24, 1964

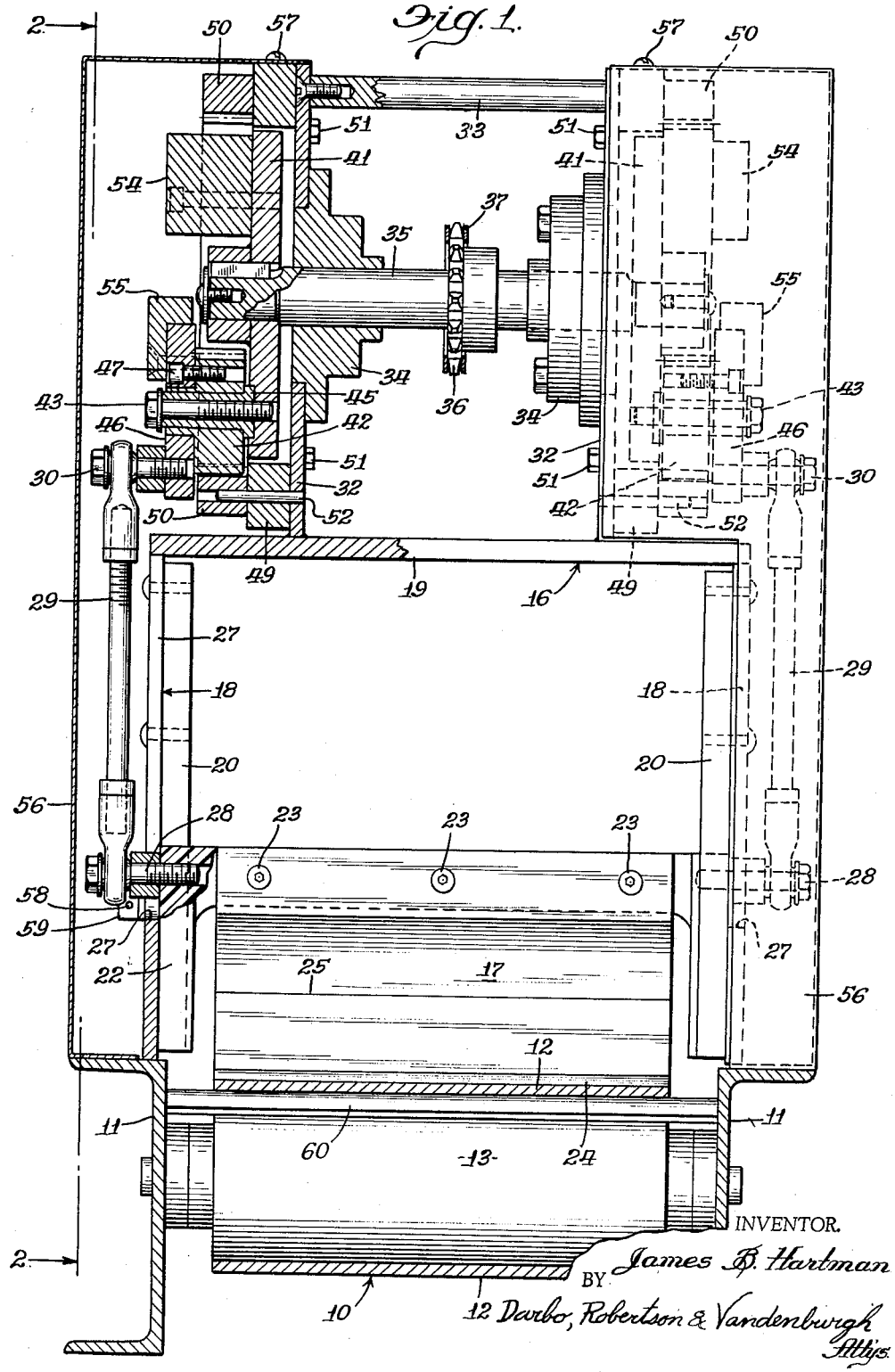

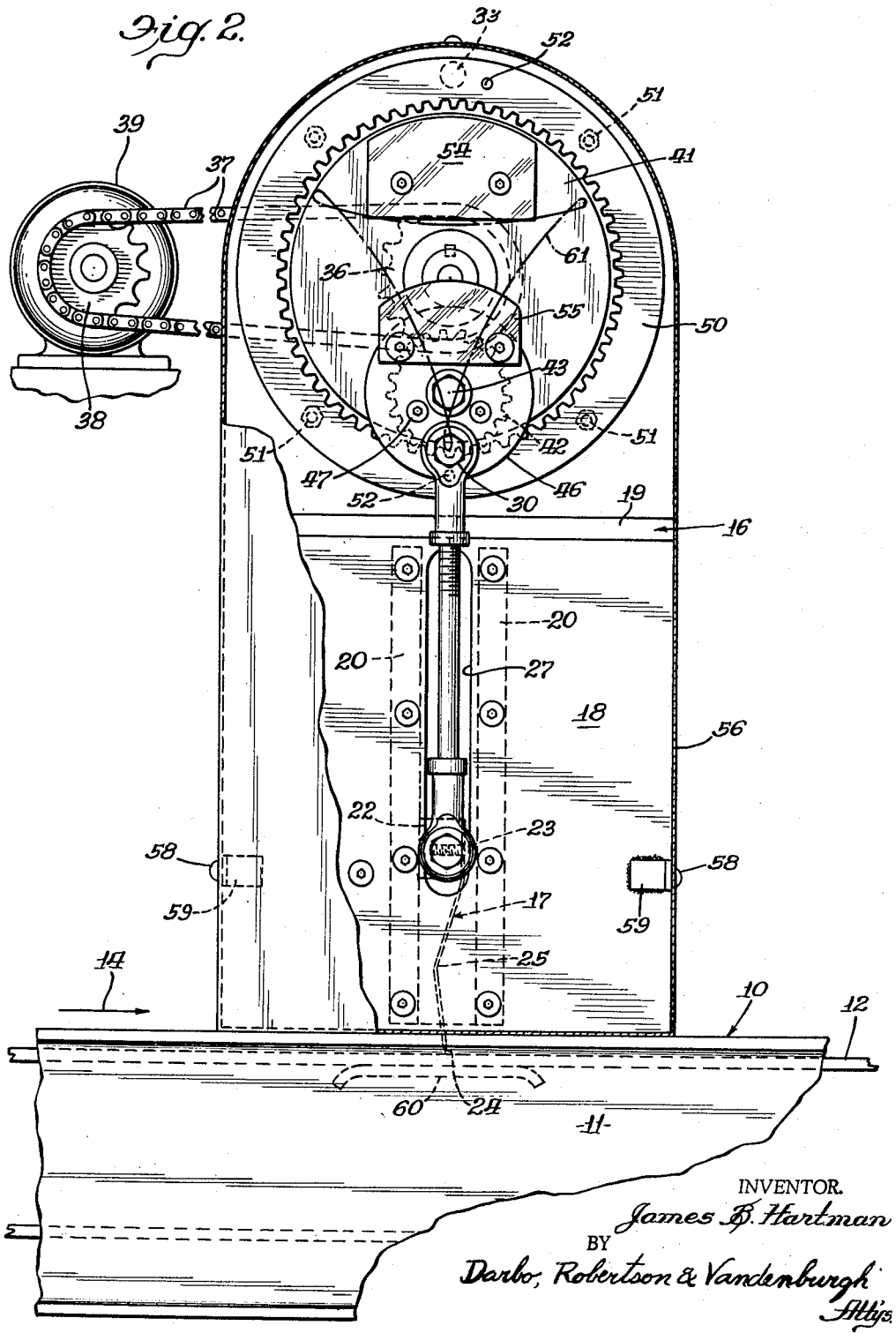

3,158,057
GUILLOTINE TYPE CINNAMON ROLL CUTTER HAVING EPICYCLE GEARING MEANS CONNECTED TO THE CUTTER BLADE
James B. Hartman, Kansas City, Mo., assignor to Interstate Bakeries Corporation, Kansas City, Mo., a corporation of Delaware
Filed Nov. 20, 1961, Ser. No. 153,537
7 Claims. (Cl. 83—355)

The present invention relates to a cutter for dividing a ribbon dough into a plurality of segments.

Mechanical dough cutters have been used by bakeries for many years. Various types of mechanical devices have been employed for this purpose with varying degrees of success. With a relatively thin ribbon of dough moving slowly along a conveyor no serious problems are encountered with the cutters commercially available. This is particularly true if a straight clean cut is not an absolute necessity and a relatively ragged uneven edge can be tolerated.

However, as the depth of the dough becomes more substantial and there is a prime necessity for a straight, even, cut with no tearing, the commercially available devices are not very satisfactory. The continuously moving dough on the conveyor tends to jam up against the knife. Between the time that the knife enters the dough, makes its complete descent, and commences to return to a point where it is above the level of the dough, the dough on the conveyor has moved forward to an extent that it is pressed against the knife blade. As the knife blade raises the dough tends to adhere thereto and the continued upward movement of the knife tears and smears the dough along the plane of the cut. The result is a ragged torn edge.

For example, in making cinnamon rolls a flat sheet of dough is coated with fat, sugar, spices, etc. The sheet of dough is then rolled to form a cylinder which may be in the neighborhood of two inches in diameter. All of this is carried out continuously. As the roll thus formed is moved axially along a conveyor, it is cut into segments which may be between about three-quarters and an inch and a half in axial length. Each of these short segmental cylinders are baked to form a cinnamon roll. In order to produce a desirable product, the cut at each end should be substantially normal to the cylindrical axis. The cut should be clean with no tearing or smearing of the dough from one convolution over to the next convolution. While the cut need not be exactly perpendicular to the cylindrical axis, a very large discrepancy between the angles of the cut and the plane normal to the cylindrical axis is undesirable. If the thickness of the slice is constant, small deviations between the angle of the cut and the plane normal cylindrical axis can be tolerated, since after the roll is baked, the deviation will not be apparent.

In order to produce an acceptable cut, the movement of the knife into and out of the dough must be very fast. While prior machines can be speeded up in order to obtain the extremely rapid knife action necessary for a proper cut, this would not solve the problem. A speeding up of a conventional machine would not only result in a quick movement of the knife into and out of the dough, but also would result in a corresponding reduction in the time interval between the time that the knife makes one cut and the time that it makes each succeeding cut. In order to achieve the desired thickness of slices, there must be a given delay between cuts to permit the conveyor to move the roll of dough into position for the next cut. Thus speeding up of the machine as a whole is self-defeating. By the same token a slowing down of the movement of the conveyor has much the same result, and, in addition, increases processing time. The principal object of my invention is to provide a cutter in which there is an extremely rapid movement of the knife into and out of the dough with sufficient delay between each cutting movement to permit the conveyor to move the continuous cylinder of dough to the proper position for the next cut.

Another feature of my invention that contributes materially to the effective operation of the machine is the particular shape of the knife blade employed. Instead of being at exactly right angles to the surface of the conveyor carrying the dough, the blade has a slight slant. When considered with respect to a direction of movement of the dough along the conveyor, the blade slants downwardly and in said direction from a point above the level of the dough to the cutting edge of the blade. As a result, as the blade is being withdrawn from the dough, the blade has the effect of moving away from the dough, thus compensating for the movement of the dough along the conveyor. This results in less tearing of the face of the dough and, in the case of items such as the cinnamon roll cylinder previously described, less smearing of the dough between convolutions.

A further feature of my invention is that it may be readily added to existing installations. For example, in practically all bakeries having mechanized operations, the cylinder which is to be used to make cinnamon rolls is formed automatically on a moving conveyor. Upon the completion of the forming of the cylinder, there is a take away conveyor to move the cylinder to some point at which it is divided into slices. The embodiments of my invention may readily be mounted on any such take away conveyor with no modifications therein. Embodiments having a standard blade width can be used with any width conveyor (so long as the blade width of the blade is at least as great as the width of the dough to be cut).

Further objects and advantages of my invention include: Embodiments are sturdy, quiet running and will have an exceptionally long service life with little maintenance; the cost of embodiments is not high, and, considering their improved performance, are competitive with existing cutting devices; and to the extent that maintenance is necessary, no special skills are required, but the embodiments may be serviced by the regular plant servicing personnel.

Additional objects and advantages will become apparent from the following description taken in conjunction with the drawings in which:

FIGURE 1 is a view transversely of the dough conveyor illustrating an embodiment of my invention, half in elevation and half in section; and FIGURE 2 is a side elevational partially in section, the section portion being as viewed at line 2—2 of FIGURE 1.

In the illustrated embodiment there is a portion of a dough conveyor generally 10. Channels 11 form the frame of the conveyor. A belt 12 is trained for movement along a given path by a plurality of rollers 13 suitably journaled on frame 11. Drive means (not shown) moves the top run of belt 12 in the direction indicated by arrow 14.

The embodiment of my invention includes a frame generally 16 suitably mounted above conveyor 10. In the illustrated embodiment, frame 16 is affixed to channels 11. Frame 16 straddles conveyor 10, with sufficient space being provided, so that the knife generally 17 can move vertically with respect to the conveyor into and out of the ribbon of dough moving along the conveyor. To this end, frame 16 includes two side members 18 and a top member 19.

Secured to each of side members 18 is a pair of guides 20, which define a way for the movement of the knife yoke 22. Yoke 22 slides in the ways defined by guides 20. To eliminate the lubrication problems, yoke 22 can be formed of a suitable, strong, relatively low coefficient of friction, plastic such as nylon.

Knife blade 17 is secured to yoke 22 by a plurality of screws 23. Knife 17 has a cutting edge 24. Between its mounting on yoke 22 and cutting edge 24, there is a horizontal bend 25 in blade 17. Between bend 25 and cutting edge 24, blade 17 slopes downwardly and in the direction of the movement of the dough as indicated by arrow 14.

Side members 18 have slots 27 therein. Connecting rod pins 28 extend through slots 27 and are secured to yoke 22. Connecting rods 29 are suitably journaled on pins 28, as well as on the upper connecting rod pins 30.

A pair of upper vertical members 32 are secured to top member 19 at their base, and connected by a spacer 33 adjacent the top thereof. Self aligning bearings 34 are secured to members 32. A shaft 35 is journaled in bearings 34. A sprocket 36 is affixed to shaft 35 and is driven by a chain 37 from a sprocket 38 on a suitable power means, such as motor 39.

Mounting members 41 are secured to each end of shaft 35. Mounting members 41 are generally circular shape. A pinion gear 42 is affixed to each of mounting members 41 by a bolt 43. Pinion gears 42 are journaled on bearings 45 surrounding bolts 43. The axis of rotation of gears 42 with respect to mounting member 41 is parallel to, and offset from, the axis of rotation of shaft 35. A mounting plate 46 is secured to each of pinion gears 42 by bolts 47. Connecting rod pins 30 are secured to mounting plate 46.

An annular spacer 49, and an internal ring gear 50, each are affixed to vertical members 32 by cap screws 51. Dowels 52 are used to assure alignment of the axis of ring gear 50 with the axis of shaft 35. The teeth of pinion gear 42 mesh with the teeth of ring gear 50. The number of teeth on the ring gear 50 should be equal to the product of the number of teeth on pinion gear 42 multiplied by an integer greater than one. By far the best operation of my invention is obtained if the number of teeth on ring gear 50 is three times the number of teeth on pinion gear 42.

Counterbalances 54 are secured to mounting members 41. Counterbalances 55 are secured to mounting plates 46. Cover plates 56 enclose the moving mechanism at each side of the machine. A screw 57 releasably affixes the top of cover plates 56 to spacers 49. Screws 58 releasably secure the bottom of the cover plates to brackets 59 on the sides of side members 18.

The illustrated gear mechanism employed to operate knife 17 is a type of an epicycle gear means, particularized by having a three to one ratio between the number of teeth on ring gear 50 versus the number of teeth on pinion gear 42. The axial center of connecting rod pin 30 will move along a path approximately as illustrated by dotted line 61 (FIGURE 2). It will be seen that this path has three lobes, all of which are constantly positioned at given points. These three points all are on the pitch line of the teeth of ring gear 50. One of the lobes is directly above knife blade 17.

The desirable characteristics of my invention, insofar as the movement of knife blade 17 is concerned, can be determined by a careful examination of path 61 in FIGURE 2. For example, assume that one were to be cutting a roll of dough whose vertical height was equal to the vertical distance between the edge 24 and the bend 25 of knife 17. The vertical movement of knife 17 to perform such a cut would occur approximately between the two points on path 61 at which the path is intersected by the bottom line of counterweight 55 (as FIGURE 2 is drawn). This portion of path 61 (below counterweight 55) is almost vertical. Thus, connecting rod pin 30 and knife 17 will be moving very rapidly in a vertical direction at this time. Furthermore, this portion of path 61 amounts to about 20% of the length of path 61, so that knife 17 will remain poised above the roll of dough (of the assumed depth) for about 80% of each cutting cycle, i.e. one revolution, of shaft 35.

Actually, in the foregoing illustration, the depth of the roll of dough has been assumed to be greater than would normally be used with an embodiment having the relative dimensions illustrated in FIGURES 1 and 2. However, the unusual characteristics of my invention are illustrated, even though the depth of the dough be assumed to be unusually greater, as compared to the machine proportions. To the extent that the depth of the dough is diminished below that assumed in the foregoing illustration, the time that the knife remains in the dough as compared to the dwell time, during which the knife is withdrawn from the dough, will substantially diminish.

The foregoing description is for the purpose of complying with 35 USC 112, and should not be construed as imposing unnecessary limitations upon the appended claims, inasmuch as modifications and variations thereof will be apparent to those skilled in the art or subsequently devised by them. For example, with some types of conveyors 10, a backing plate 60 will be used to prevent the belt 12 from sagging at the point at which the dough is to be cut.

I claim:

1. A dough cutter for cutting into transverse segments a ribbon of dough moving longitudinally along a path, said cutter comprising: a frame; a knife mounted on said frame for linear movement toward and away from said dough, said knife having a cutting edge transverse to said path; epicycle gearing means having a member moving along a course having at least two lobes and connected to said knife to move the knife into and out of said path as said member traverses one of said lobes to thereby move said knife quickly into and out of said path and to hold said knife out of the path of said dough for a substantially longer time than the time that the knife is in the path of the dough; and power means connected to the epicycle gearing means.

2. A dough cutter for cutting into transverse segments a ribbon of dough moving longitudinally along a path, said cutter comprising: a frame; a knife mounted on said frame for linear movement toward and away from said dough, said knife having a cutting edge transverse to said path; epicycle gearing means connected to knife to move said knife into and out of said path, said means including, an internal ring gear and a orbital pinion gear meshing with said ring gear, the number of teeth on said ring gear being equal to the product of the number of teeth on said pinion gear multiplied by an integer greater than one, and means connecting the pinion gear to the knife; and power means connected to the epicycle gearing means; whereby said knife is moved quickly into and out of said path and held out of said path for a substantially longer time than the time that it is in said path.

3. A dough cutter for cutting into transverse segments a ribbon of dough moving longitudinally along a path, said cutter comprising: a frame; a knife mounted on said frame for linear movement toward and away from said dough, said knife having a cutting edge transverse to said path; a shaft rotatably mounted on said frame and having an axis; a pinion gear attached to said shaft for rotation about said axis, said pinion gear being rotatable about a second axis parallel to and spaced from the shaft axis; a crank pin attached to said pinion for rotation therewith; an internal gear fixed to said frame, concentric with said shaft axis and engaging said pinion gear, said internal gear having three times as many teeth as said pinion gear; a crank connecting said crank pin and said knife; and power means connected to said shaft to rotate said shaft; whereby said knife is moved quickly into and out of said path and held out of said path for a substantially longer time than the time that it is in said path.

4. A dough cutter for cutting into transverse segments a ribbon of dough moving longitudinally along a path into segments, said cutter comprising: a frame; a knife mounted on said frame for linear movement toward and away from said dough, said knife having a cutting edge transverse to said path; a shaft rotatably mounted on said frame and having an axis; a pinion mounting member attached to said shaft; a pinion gear rotatable attached to said mounting member at a point spaced from said axis; a crank pin attached to said pinion for rotation therewith; an internal gear fixed to said frame, concentric with said shaft axis and engaging said pinion gear, said internal gear having three times as many teeth as said pinion gear; a crank connecting said crank pin and said knife; counterweight means on both said mounting member and said pinion gear; and power means connected to said shaft to rotate said shaft; whereby said knife is moved quickly into and out of said path and held out of said path for a substantially longer time than the time that it is in said path.

5. A dough cutter for cutting into transverse segments a ribbon of dough moving longitudinally in a given direction along a path, said cutter comprising: a frame; a knife mounted on said frame for linear movement toward and away from said dough normal to said path, said knife having a cutting edge approximately normal to said path, said knife being slanted in said direction toward said cutting edge; a shaft mounted on said frame for rotation about an axis; a pinion gear attached to said shaft for rotation about said axis, said pinion gear being rotatable about a second axis parallel to and spaced from the shaft axis; a crank pin attached to said pinion gear for rotation therewith; an internal gear fixed to said shaft, concentric with said shaft axis and engaging said pinion gear, said internal gear having three times as many teeth as said pinion gear; a crank connecting said crank pin and said knife; and power means connected to said shaft to rotate said shaft; whereby said knife is moved quickly into and out of said path and held out of said path for a substantially longer time than the time that it is in said path.

6. A dough cutter for cutting into transverse segments a ribbon of dough moving longitudinally in a given direction along a path, said cutter comprising: a frame; a knife mounted on said frame for linear movement toward and away from said dough, said knife having a cutting edge approximately normal to said path, said knife being slanted in said direction toward said cutting edge; epicycle gearing means having a member moving along a course having at least two lobes and connected to said knife to move the knife into and out of said path as said member traverses one of said lobes to thereby move said knife quickly into and out of said path and to hold said knife out of the path of said dough for a substantially longer time than the time that the knife is in the path of the dough; and power means connected to the epicycle gearing means.

7. A dough cutter for cutting into transverse segments a ribbon of dough moving longitudinally in a given direction along a path, said cutter comprising: a frame; a knife mounted on said frame for linear movement toward and away from said dough, said knife having a cutting edge approximately normal to said path, said knife being slanted, with respect to the line of movement thereof, in said direction toward said cutting edge; and power means connected to said knife to move said knife into and out of said path.

References Cited by the Examiner

UNITED STATES PATENTS

| | | | |
|---|---|---|---|
| 2,170,425 | 8/39 | Dalenius et al. | 17—4 |
| 2,478,020 | 8/49 | Stiles | 83—309 |
| 2,506,736 | 5/50 | Oschwald | 74—52 |
| 2,529,997 | 11/50 | Browne | 74—52 |
| 2,576,533 | 11/51 | Ott | 83—111 |
| 2,660,133 | 11/53 | Antesberger et al. | 83—308 |
| 2,676,799 | 4/54 | Fletcher | 74—52 |

FOREIGN PATENTS 496,521    4/30    Germany.

WILLIAM W. DYER, JR., *Primary Examiner.*

EDWARD C. ALLEN, ANDREW R. JUHASZ,
*Examiners.*